(12) United States Patent
Borella et al.

(10) Patent No.: US 6,442,141 B1
(45) Date of Patent: Aug. 27, 2002

(54) NETWORK DELAY AND LOSS SIMULATOR

(75) Inventors: Michael S. Borella, Naperville; Ikhlaq Sidhu, Vernon Hills; Thad Konar, Hoffman Estates; Jones Brobbey, Arlington Heights; Parin Mody, Buffalo Grove, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/143,803

(22) Filed: Aug. 31, 1998

(51) Int. Cl.[7] .................................. H04J 1/16
(52) U.S. Cl. ....................................... 370/248
(58) Field of Search ................. 370/348, 248, 370/387, 395, 351, 352, 401, 402, 403, 465, 241, 503, 509, 512, 252, 251, 466, 471, 474, 467, 229; 709/227, 217, 228, 232, 201, 204, 206, 212, 300, 301; 703/13, 14

(56) References Cited

U.S. PATENT DOCUMENTS

| 5,444,709 A | * | 8/1995 | Riddle | 340/825 |
| 6,014,707 A | * | 1/2000 | Milles et al. | 370/252 |
| 6,088,729 A | * | 7/2000 | McCrory et al. | 709/227 |

OTHER PUBLICATIONS

*Internet Packet Loss: Measurement and Implications for End–to–End QoS* by Michael S. Borella and Debbie Swider, Proceedings of the International Conference on Parallel Processing, Aug. 1998.

*Measurement and Analysis of Long–Range Dependent Behavior of Internet Packet Delay* by Michael S. Borella and Gregory B. Brewster, Proceedings of IEEE Infocom, Apr. 1998.

*Real–Time Voice Over Packet–Switched Networks* by Thomas J. Kostas, Michael S. Borella, Ikhlaq Sidhu, Guido M. Schuster, Jacek Grabiec, and Jerry Mahler, IEEE Network, Jan./Feb. 1998.

* cited by examiner

*Primary Examiner*—Dang Ton
(74) *Attorney, Agent, or Firm*—McDonnell Boehnen Hulbert & Berghoff

(57) ABSTRACT

A test system and method for providing a network simulator to simulate the packet delivery delay and loss dynamics of an network such as the Internet. The test system delays and drops packets delivered between host devices on the test system according to a trace profile of the actual network packet delivery dynamics. The trace profile is recorded using a network measurement system transmitting and measuring the delivery of packets on the network. The trace profile records the actual network packet delivery dynamics, which is utilized by the test system to simulate the network packet performance. Using the test system as a network simulator, developers of interactive network application can accurately develop and test the performance of interactive network applications under realistic network conditions.

36 Claims, 6 Drawing Sheets

FIGURE 4

RUNNING WITH THE FOLLOWING PARAMETERS

Interval :              30 ms
Packet Seize :          80 bytes
Duration :              1 minute Sat Mar  1 00 : 10 : 00 1997

0 . 98 : 1 : 75 . 34
1 . 01 : 2 : 76 . 68
1 . 04 : 3 : 72 . 37
1 . 07 : 4 : 72 . 25
1 . 10 : 5 : 73 . 79
1 . 16 : 7 : 75 . 70
1 . 19 : 8 : 75 . 84
1 . 22 : 9 : 86 . 25
1 . 25 : 10 : 71 . 70

Total received by client : 9
Total transmitted by client : 10
Total received by server : 10

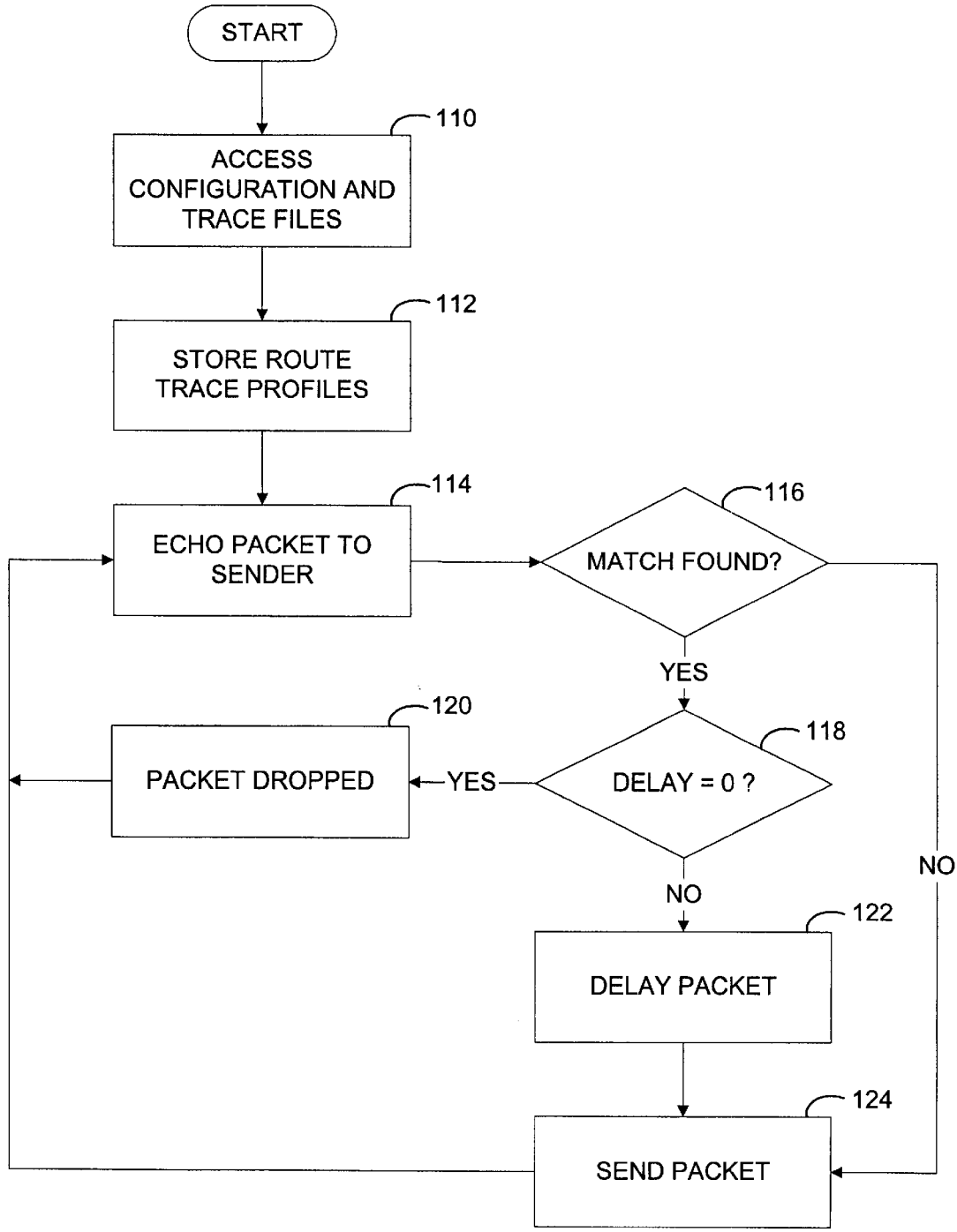

NETWORK DELAY AND LOSS SIMULATOR

FIELD OF INVENTION

This invention relates in general to the testing and analysis of communication networks and more particularly, it is directed to providing a system capable of accurately simulating network packet delivery delay and loss dynamics.

BACKGROUND OF THE INVENTION

The Internet is a worldwide network of interconnected computers allowing users to transmit, access and obtain files from other computers and users on the network. In recent years, the Internet is becoming used more and more for real-time interactive applications such as Internet telephony, interactive gaming and videoconferencing to conduct meetings over the network without having to travel to the meeting location or incur long distance communication charges.

The performance of these network applications, however, has generally disappointed users due to the vagaries of the performance and reliability of interactive communication over the Internet. The Internet was not originally designed for interactive communication, but rather, the bulk transport of data using non-interactive protocols, such as sending electronic mail ("E-mail"), File Transfer Protocol ("FTP"), and network news ("USENET"). Regardless, a number of real-time protocols have been designed and marketed, including RealAudio by RealNetworks, NetMeeting by Microsoft, and many others.

Performance of anetwork application software is based on a quality of service (QoS) that depends on network packet delivery delay and loss dynamics. Internet dynamics, however, can be extremely variable. Packet delay and loss characteristics between two hosts may remain stationary for an hour or more or they may change dramatically second-by-second. Different host pairs of devices communicating over the same network may experience different dynamics due to available network bandwidth and background traffic patterns. This temporal and spatial heterogeneity of the network performance makes it difficult to directly compare two protocols or two different versions of the same protocol in a controlled manner on the network.

While network application designers can use a number of protocol techniques to mask both network packet delay and loss, it is difficult to directly test the effectiveness of these techniques in a controlled environment. Attempts to mathematically model network packet delivery delay and loss characteristics have generally proven inaccurate and unreliable. Because of these difficulties, protocols are either not tested at all or tested only in a naive fashion. For example, an interactive network application such as a Internet Telephony scheme might be tested by placing the client/server package at various endpoints throughout the Internet, transmitting calls between pairs of these points for some period of time (say, one month) and then analyzing the results. To determine the performance tradeoffs between various parameters, some of these endpoints may run slightly different versions of the protocol package. Such testing, however, is subject to the different network packet delivery dynamics that may vary significantly over time and requires long testing periods. There is little control over the differing network conditions and thus meaningful comparisons between different protocols are difficult to draw.

It would be desirable to provide a system capable of artificially creating stochastically accurate packet delay and loss to simulate actual network conditions.

SUMMARY OF THE INVENTION

In accordance with an illustrative embodiment of the present invention, problems associated with designing, developing and testing network applications software are addressed. According to an aspect of the illustrative embodiment, the network simulator system simulates the packet delay and loss characteristics of a network and allows the testing of interactive applications on the network. The illustrative system provides high accuracy in simulating network dynamics enabling developers of network applications software to design, develop and rigorously test applications in a controlled and reproducible environment that accurately reflects network packet delivery delay and loss dynamics between devices on the network. Providing controlled network dynamic conditions that accurately reflect actual network conditions allow application developers to draw meaningful performance tests of interactive network applications such as Internet telephony, interactive gaming, and videoconferencing.

According to an aspect of the invention, a network simulator is provided to test interactive applications running on host devices communicating over a network. It should be understood that non-interactive applications can also be tested using the network simulator. The network simulator simulates the delay and loss conditions of the actual network using a trace-driven simulation based on measurements of network packet delivery dynamics. In an illustrative embodiment, the network router includes a device driver in the form of a packet forwarding software routine that delivers packets according to a trace profile.

According to another aspect of the invention, a network measurement system measures packet delay and loss through the network to generate trace profiles that accurately reflect the network packet delivery and delay dynamics. The network measurement system includes a client and a server located at endpoints or host devices on the network. The client sends packets across the network to the server, which in turn echoes the packet back to the client. By monitoring the departure and arrival time of the packets, the network measurement system can produce trace files that accurately portray network packet delivery performance between the endpoints. Monitoring the sequence number of the transmitted and received packets allows packets delivered out of the order that they were originally transmitted to be determined, as well as allowing dropped or lost packets to be discovered. To represent a lost packet, the delay time parameter is set to zero.

In this manner, the network measurement system creates trace profiles reflecting the actual network dynamics.

According to another aspect of the invention, the trace files produced by the network measurement system can by used by the network simulator to reproduce actual network delay and loss characteristics.

According to yet another aspect of the invention, a preferred method of measuring network delay and loss characteristics is described. The disclosed method includes the steps of transmitting a sequence of packets from a client to a server communicating over the network, receiving the packets transmitted over the network, echoing the packet back over the network to the client; and logging the delivery of the packet in a trace file.

According to another aspect of the invention, a preferred method for simulating packet delivery dynamics of a network includes the steps of matching a trace profile corresponding to a pair of host devices at endpoints of the network and delaying or dropping the transmission of the packet according to the trace profile.

Developers of interactive as well as non-interactive applications such as Internet telephony, videoconferencing and interactive gaming applications communicating over a packet-based network can design, develop and rigorously test their systems in a controlled environment. The control and reproducibility of the network environment allows network applications to be directly tested and compared to gauge the effects of changes in protocol and maximize the efficiency of the application.

The foregoing and other features and advantages of an illustrative embodiment of the present invention will be more readily apparent from the following detailed description, which proceeds with references to the accompanying drawings.

BRIEF DESCRIPTION OF THE DRAWINGS

FIG. 4 shows an exemplary trace file output by the network measurement system; and FIGS. 5 and 6 show flow charts of an illustrative method according to another aspect of the invention.

DETAILED DESCRIPTION OF AN ILLUSTRATIVE EMBODIMENT

Figure 1:
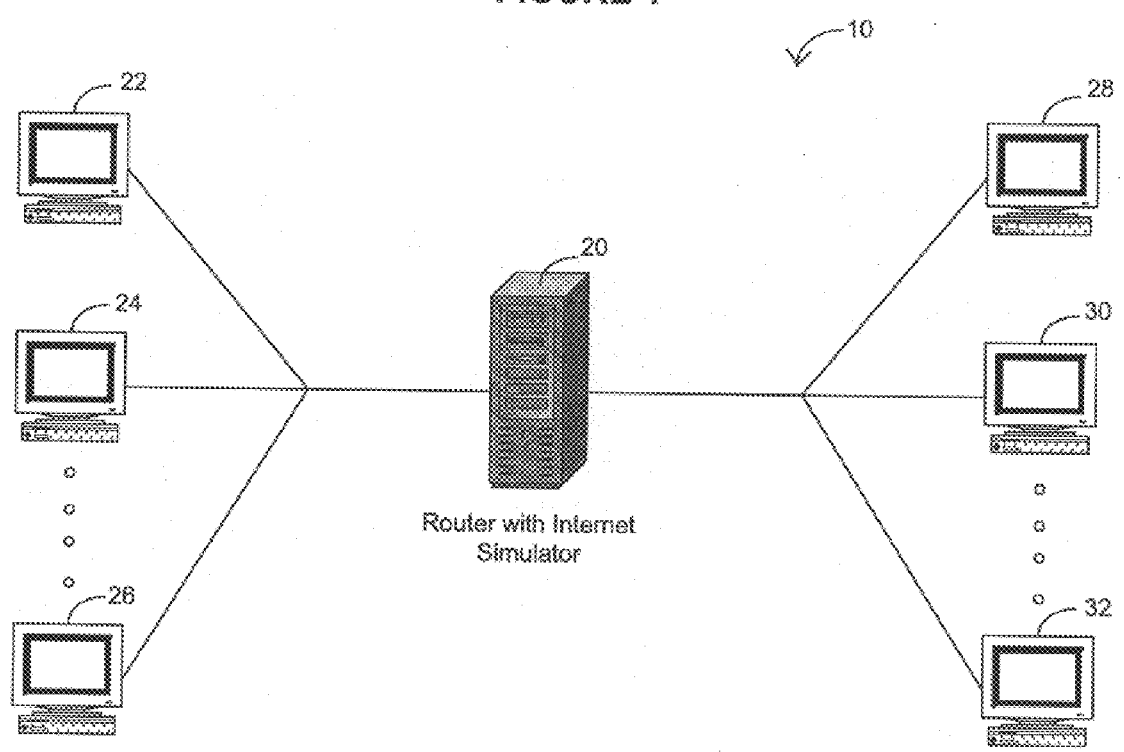
FIG. 1 shows a simplified block diagram illustrating a network simulator system according to aspect of the present invention.

FIG. 1 diagrammatically illustrates a simplified example of an exemplary test system 10 utilizing a network simulator in an illustrative embodiment of the invention. In the exemplary system, the network simulator utilizes a router 20 to interconnect a plurality of host devices 22, 24, 26, 28, 30, 32. The router 20 and the interconnected host devices 22, 24, 26, 28, 30, 32 form a network capable of simulating the packet delivery and delay dynamics of an actual data communication network. Preferably, the router 20 is equipped with a network simulator software program capable of simulating the packet delivery delay and loss characteristics of the network. Generally, a router provides virtual connections between networks and/or network devices by routing packets of information between the networks or network devices. The information packets carried by the network may contain the data, audio, video, text, graphics and other multimedia information. Routers may provide differing levels of functionality such as discovering the location of destination devices and finding routes between different networks and devices. Other network connection or interconnection devices such as gateways or bridges are often referred to as routers, although routers generally provide a somewhat higher level of functionality than bridges and lower level of functionality than gateways. In the illustrative embodiment, the router 20 implements the TCP/IP (Transmission Control Protocol/Internet Protocol) protocol as utilized by the well-known Internet. Other protocols such as UDP are also suitable for use with the present embodiment.

In the present embodiment, the router 20 can be embodied as the IP forwarding software of the LINUX operating system with networking capability. The LINUX operating system is available for common computer platforms such as computer systems using Intel Pentium processors.

The router 20 of the network simulator serves the plurality of host devices 22, 24, 26, 28, 30, 32 which are identified by IP addresses according to the well-known Internet address protocol. The host devices 22, 24, 26, 28, 30, 32 may be any computer or communication devices capable of connecting to the Internet or other digital computer network, such as a packet-based network. The host devices are preferably interfaced to the router using the TCP/IP network protocol of the router 20 or other suitable communication protocols such as implemented with Asynchronous Transfer Mode ("ATM") Novell Netware IPX, and IBM SNA. The host devices are preferably running an interactive network application such as Internet telephony, videoconferencing, or interactive gaming applications communicating through the Internet. Of course other interactive applications such as on-line auction or bidding systems, stock trading systems, etc. are also suitable for the present embodiment.

To simulate the delay and loss network dynamics across a network connection between pairs of host devices, the router 20 includes an IP forwarding software routine to delay or drop IP packets according to the delay characteristics between the host devices. The IP forwarding software may be provided as part of an operating system kernel or be included as a separate software device driver. In the illustrative embodiment, the router 20 includes a trace file containing measured packet delivery delay and loss characteristics between two host devices. The packet delivery delay and loss dynamics between pairs of host devices are measured and stored in the trace files which are loaded and executed by the IP forwarding software routine of the router 20 to dictate the delay or loss of packets. Using the trace files containing measured packet delivery delay and loss conditions allows the test system to accurately simulate network delivery dynamics between the two host devices. The network measurement system to measure delay characteristics between devices and generate trace files, referred to as MID ("Measuring Internet Delay") in this embodiment, will be discussed in more detail below.

In the illustrative embodiment, a configuration file is utilized to specify to the router IP forwarding software the appropriate trace file specifying the network delay characteristics for each pair of host devices. The host devices in this example are identified by IP addresses, well known to those skilled in the art. An IP address typically consists of four non-negative numbers, each less than 256, separated by periods:

149.112.240.5

149.112.240.250

Each line in the configuration file contains a source IP address and a destination IP address, which together form a host device pair, and a trace file name entry corresponding to the host device pair. The source IP address and the destination IP address pairs specify the trace file that dictate the delay and loss dynamics of an network connection between the pair of host devices. The trace files contain trace profiles that reflect the network packet delivery delay and loss characteristics between two host devices. For example, packet transmissions between source host IP address 149.112.240.5 to destination host address 149.112.240.250 can simulate network delay conditions from trace file trace.001 with the following entry in the configuration file:

149.112.240.5 149.112.240.250 trace.001

Note that only packets travelling from 149.112.240.5 are delayed or dropped based on the trace files. This particular trace file does not affect packets travelling between any two other hosts on the network or in the opposite direction. Preferably, the configuration file will include a list of IP address host pair entries corresponding to the host devices on the network and specify the trace file for each of the host pairs. Tabs, spaces, commas, colons or other delimiters can be used to delimit each of these entries. In this exemplary embodiment, the configuration file is stored in an appropriate subdirectory of the simulator using a UNIX standard file system such as /etc/inetsim/, which may contain a plurality of configuration and trace files.

The trace file specified by the configuration file is read into a memory data structure. Preferably, the trace profiles are stored in a route data structure maintained in memory for ready access to the appropriate trace parameters for a host device pair. The route data structure contains the source and destination IP addresses, "saddr" and "daddr" in the above example, that indicate the host device pairs that the parameters of the trace entry data structure are applicable. An exemplary route data structure, "inetsim_route", is shown below. #

```
defineINETSIM_TRACESIZE 6100
typedef struct_inet_route {
    unsigned long saddr; /* source IP address */
    unsigned long daddr; /* destination IP address */
    inetsim_trace_instance[INETSIM_TRACESIZE];
    int last_instance; /* pointer to last valid trace instance
       */
    int curr; /* pointer to current trace instance */
    struct_inetsim_route *next; /* ptr to next route*/
    struct_inetsim_route *prev; /* ptr to prev route*/
}inetsim_route;
```

Thus, the trace file specified by the configuration file are read into the "inetsim_route" route data structure to hold the trace profiles for the connection route between a particular pair of host devices. Preferably, a list will be maintained including a route data structure for each pair of host devices on the network. Those of skill in the art will appreciate that a route data structure entry will exist in the list for each permutation of pairs of host devices on the network.

Figure 2:
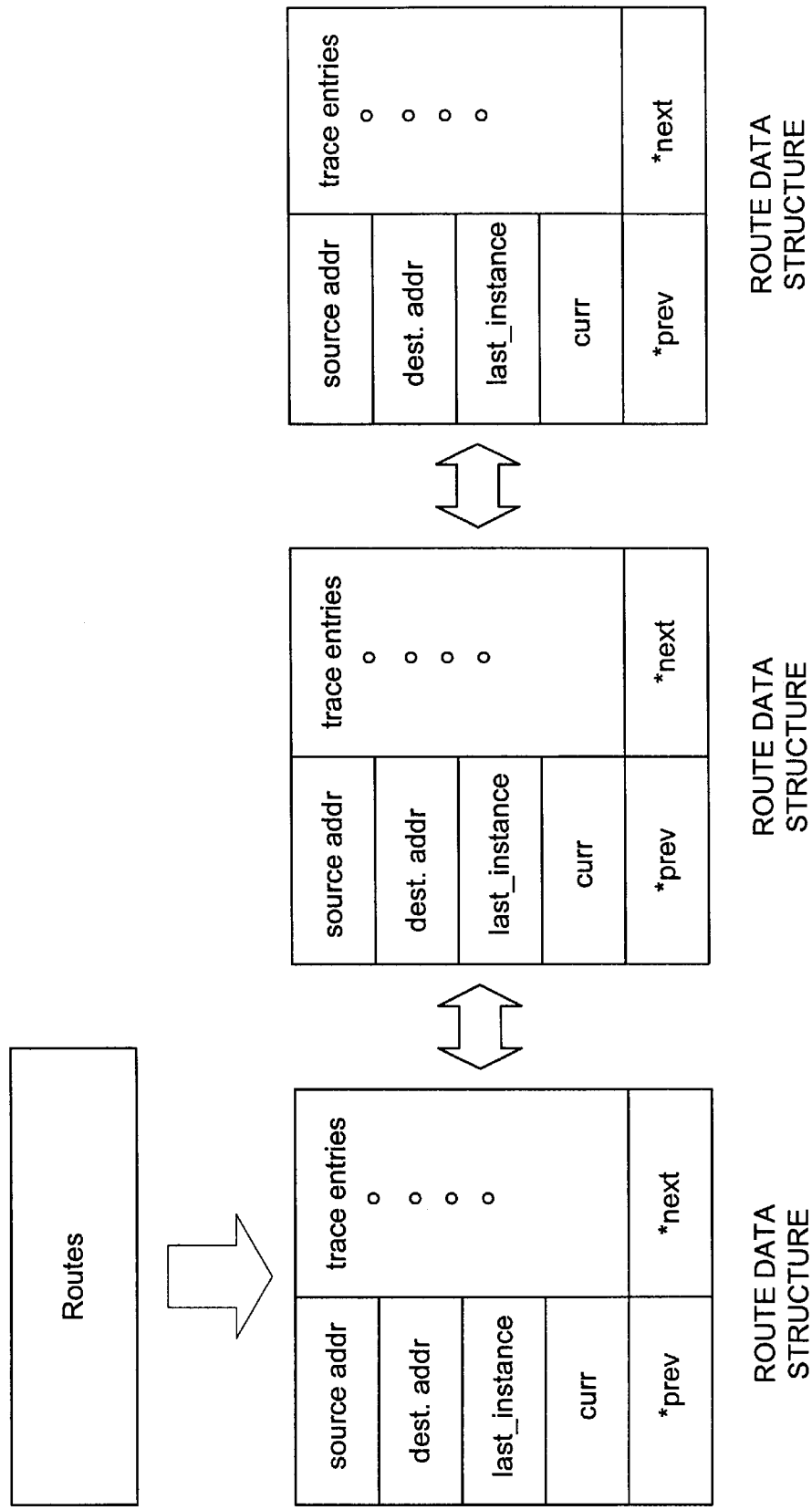
FIG. 2 shows a linked list of data structures utilized in the illustrative embodiment.

As shown in FIG. 2, a plurality of route data structures for each pair of host devices are preferably linked together in a doubly linked list as indicated by the "*next" and "*prev" pointers. The last_instance field implements a pointer indicating the last valid sequence number in the route data structure list. Each of the route data structures can hold a plurality of trace profile entries for each pair of host devices in a trace profile entry array formed of trace entry data structures, "inetsim_trace_instance" as shown below.

```
typedef struct _inetsim_trace_instance {
    float ts; /* timestamp */
    int rtt; /* round trip time */
}inetsim_trace_instance;
```

The curr pointer has the value of the next number sequence to use in the trace profile entry array. In the current example, the number of maximum trace profile entries is set by the variable INETSIM$_{13}$ TRACESIZE, which is equal to 6100. Each trace profile entry data structure contains an associated timestamp and round-trip delay parameter, "ts" and "rtt" respectively in the above example. The value of these parameters are determined by the network measurement system that will be described below in more detail. In the case of a lost packet, the delay parameter rtt will contain value of "0". It should be understood that the data structures, variable and other embodiments described are merely exemplary and numerous other data structures and variables may used.

Referring again to FIG. 1, the network simulator uses the trace files to simulate the packet delivery delay and loss in the test system 10. The router 20 includes an IP forwarding software routine that controls the routing of packets through the network. The IP forwarding routine of the router calls a software function before the forwarded packets are passed to the network interface card of the router. The software function checks the source and destination IP address of each packet against the pair in each node of the linked list. If a match is not found, there is no delay and loss characteristic for that connection and the packet is forwarded to its destination in the usual manner. If a match is found, the trace profile entry in the trace array pointed to by the pointer variable current or "curr" is used for the packet. The curr variable is used in this embodiment to indicate the current trace profile that should be utilized to determine the packet delivery and delay performance. If this entry indicates that the packet should be dropped, the function returns a token value to the IP forwarding software routine that recognizes the token value indicating a dropped packet and does not transmit the packet. The packet is thus effectively deleted and dropped.

Figure 3:
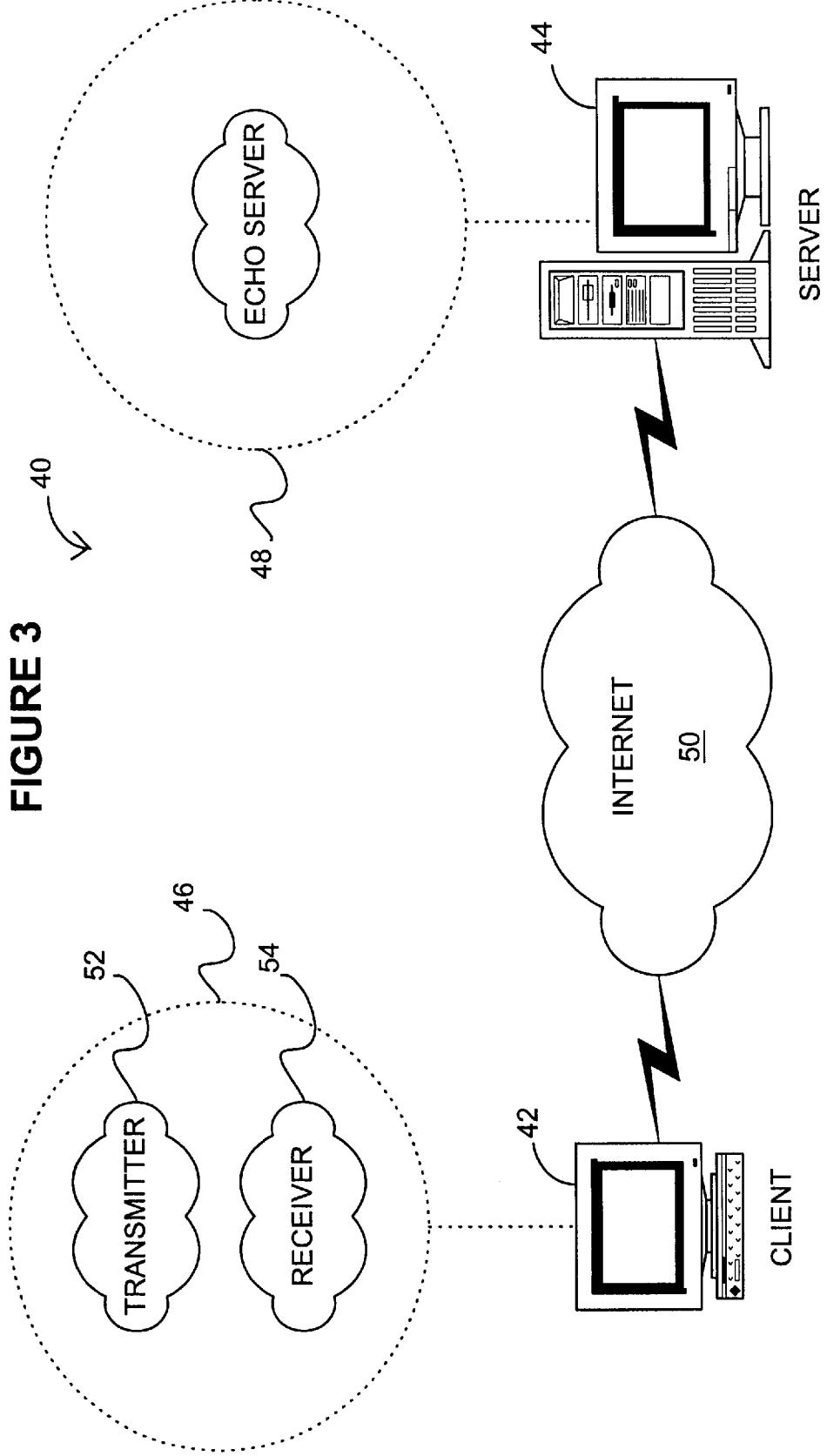
FIG. 3 shows simplified block diagram of a network measurement system according to another aspect of the present invention.

FIG. 3 shows the network measurement system or MID ("Measuring Internet Delay") system 40 which can be utilized to measure network delivery dynamics. In this embodiment, the network measurement system measures packet delay and loss on a network connection between pairs of host devices. The network measurement system includes a distributed application layer program with a client software program 46 and a server software program 48 running on two different hosts devices on the network. The host devices 42, 44 are capable of communicating information in packets transmitted over the network 50 that is to be simulated, such as the Internet.

The client software program 46 consists of two processes running in parallel, a transmitter process 52 and a receiver process 54, on the client host device 42. It should be understood that the client software program 46 could also be implemented as a single process using interrupts and/or multithreaded programming. Due to the additional programming complexity of implementing the single process, however, this exemplary embodiment will be described as two processes. The client transmitter process 52 uses a timer to schedule the transmission of a stream of UDP packets with regular inter-departure times across the network 50 to the server host device 44. The timer may be embodied as either a software or hardware timer. Each packet contains a sequence number and a client identifier ("CID"). Preferably, the CID is a 10-bit string chosen at the beginning of a session. The server host device 44 includes an echo server process 48 saves the last CID of the packet it has received. When the echo server process 48 receives a packet with a CID different that is different than the stored CID, it sets a packet count ("PC") to zero. When the server process 48 receives a packet with a CID identical to the stored CID, it increments its packet count by 1. Each packet received by the server process 48 is also echoed back over the network 50 to the client host device 42, and if not lost by the network 50, it is received by the client's receiver process 54. Packets lost from the client host device 42 to the server host device 44 as well as packets lost from the server host device 44 and client host device 42 can be determined from the packet sequence numbers as described below.

The client receiver process 54 logs the sequence number of all the echoed packets it receives from the server process 48. When the client transmitter process 52 has completed sending a packet stream, it transmits an end-of-transmission token ("EOT") to the server process 48. The server process 48 receives the EOT and responds by sending the current content of its PC register back to the client receiver process 54.

If either the EOT or PC register packets are lost and not received by the receiver process 54, the transmitter process 52 will timeout and then retransmit the EOT until it successfully receives the server's 44 response. For each packet transmitted and received between the host devices, a trace profile line is generated in the trace file recording a timestamp indicating the number of seconds elapsed between when the program was originally run and the packet was transmitted. The sequence number and round trip delay of the packet is also recorded in the trace file. A line of the trace file is thus in the format:

<timestamp>:<sequence number>:<round-trip delay>

An example trace file format including 10 packet trace profiles is shown in FIG. 4. As shown in the example, the trace file also includes a header that records the inter-departure interval time, the packet size, the duration of the trace, and the current date and time. In the example of FIG. 4, the interval is 30 milliseconds ("ms"), the packet size is 80 bytes, the duration 1 minute and the date and time Saturday, Mar. 1, 1997 at 12:10 AM. The trace file then contains the trace lines for each of the 10 packets transmitted.

The fields of the trace line representing the trace profile are the timestamp, sequence number, and round-trip delay values delimited by the ":". As seen in the example of FIG. 4, each of the timestamps, for example 0.98, 1.01, 1.04, 1.07..., are separated by the 30 ms inter-departure interval. The packet sequence numbers are consecutive for 1 to 10, except that packet sequence number "6" is missing, indicating a lost packet. The round trip times in the last field are generally in the range of 71–76 milliseconds with the exception of number 6, which is missing, and number 9 which is above 86 milliseconds. A trailer at the bottom of trace file dumps the number of packets successfully transmitted and received by each host. Note that the packet number 6 was dropped on the way back from the server 44 back to the client 42.

It should be understood that although the MID software described above was used to drive the network simulator, other methods and software packages that collect network dynamics such as ping and tcpdump as described in Richard Stevens, "TCP/IP Illustrated Volume I" Addison-Wesley 1994, may also be used.

The trace files produced by the network measurement system 40 can then be used by the network simulator 10 of FIG. 1 to simulate the network packet delivery dynamics in a controlled and reproducible manner. The configuration file specifying the appropriate trace files and the trace files are loaded onto the network simulator router 20 of the test system 10. The network simulator can then access the appropriate configuration files which indicate the appropriate trace files to simulate the actual network dynamics using the test system 10.

Figure 5:
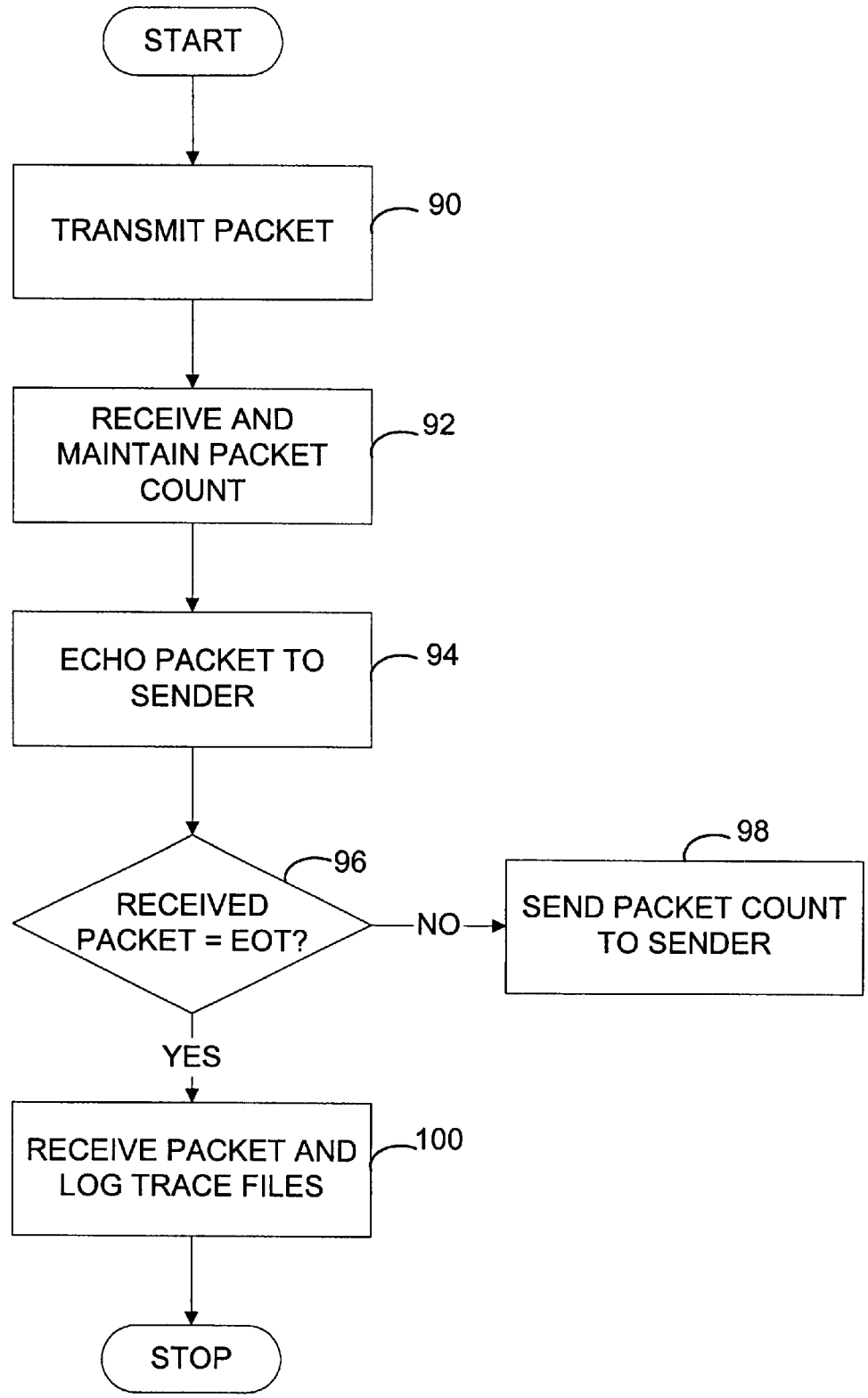

Referring now to FIG. 5, a method of measuring actual network packet delay and loss delivery dynamics by creating trace profiles is described. The illustrative method includes the steps of transmitting a stream of packets at a client, receiving the stream of packets at the server, echoing the received stream of packets form the server back to the client, receiving the echoed stream of packets, and measuring the delivery of the echoed stream of packets. At step 90, a first host device transmits a sequence of packets to a second host device across the network regular inter-departure times. It should be understood that the present embodiment could also transmit packets at arbitrary inter-departure times. The host devices are at endpoints of the network whose packet delivery dynamics are to be measured. Each transmitted packet is identified with a sequence number and client identifier that can be used to determine out-of-order packet arrival and packet loss. When the first host device has completed sending the sequence of packets, it sends an end-of transmission token to the second host device.

At step 92, the sequence of packets are received by a second host device. The second host device examines the received packet and saves the client identifier of the last packet received. When the second host device receives a packet with a client identifier different than the stored client identifier, it sets a packet count register to zero. When the second host device receives a packet client identifier identical to the one it has stored, it increments the packet count register.

At step 94, each received packet is echoed back to the first host device which sent the sequence of packets. At step 96, when the second host device receives the EOT token, it also sends the contents of its packet count register indicating the number packet received to the first host device at step 98.

If the echoed packets are not lost by the network, they are received by the first host device at step 100. The sequence numbers of all the received packets and the round-trip delay times are recorded. The sequence numbers and round-trip delay times are logged in the trace file corresponding to the host pair to store the results and form a profile of the network packet delivery dynamics between the first and second host devices. The trace file can be embodied as previously discussed. In other embodiments, the network measurement results can be simply be stored in random access memory and used from memory. In yet another embodiment, the network measurement results are transmitted to another device without writing the results to a file. It should be understood that a number of variations to the method can be made. On of skill in the art may chose to use other mechanisms or parameters to record and monitor the packets. The trace profile may accordingly take other appropriate forms.

Referring now to FIG. 6, the trace files created by the described method of measuring actual network packet and delay loss can be utilized by a network simulator including a router with IP forwarding software routine that can delay or drop packets according to the trace profile. The configuration and trace files are loaded onto the router of the network simulator such as that shown in FIG. 1. The router IP forwarding software routine can transmit packets according to the trace parameters by using the method shown in FIG. 6.

At step 110, the router 20 of the network simulator accesses the files by reading in the configuration file and appropriate trace files specified by the configuration file. In the current example, the configuration file associates pairs of host devices on the network with a trace file containing trace profiles describing the packet delivery dynamics between the host devices.

At step 112 the route trace profiles are stored for convenient access. Preferably, the information contained in the trace file is read in from a storage device and parsed into a linked list of route data structures stored in memory. The route data structure preferably includes an array of trace profiles describing the network packet delivery dynamics between the host devices. The route data structure can be accessed by the IP forwarding software routine to delay and drop packets according to the delay and loss parameters of the appropriate trace file.

At step 114, the network simulator IP forwarding software searches the route data structure linked list for a route data structure with a source and destination address pair that matches the source and destination address of the host devices to which the packet is to be transmitted. Preferably, the host device pairs are identified by IP addresses, well known to those skilled in the art. At step 116, if no match is found, a trace profile to delay the packet is not available. The packet can then be immediately transmitted without delay at step 124. At step 116, if a match is found, a trace profile to delay the packet is available. The matching route data structure is accessed and the round-trip delay parameter "rtt" in the above example is examined. At step 118, if the rtt parameter is equal to zero, the packet has been lost or dropped and is accordingly dropped by the IP forwarding routine to simulate the actual loss of a packet at step 118. Otherwise, the packet is delayed at step 120.

In a present embodiment, the packet is delayed according to the trace profile rtt parameter in the route data structure using a delay queue. If a packet is to be delayed, the amount of time the router will wait before transmitting the packet is derived from the round-trip delay parameter, rtt. The current time of day is obtained and the delay time specified by the trace profile is added to the current time to calculate the transmit time. An operating system timer is given the packet and programmed to expire in the required number of ticks. When the timer expires, a soft interrupt is generated, which gives the packet to the network interface card device driver to transmit the packet at step 122. Alternatively, the transmit time is used to insert the packet into a delay queue at the place in the queue according to the time the packet is to be transmitted. At step 122, packets are then transmitted from the queue at the appropriate time by the IP forwarding software routine. In addition, the curr pointer can be incremented to point to the next trace profile. If the new value is greater that last_instance, it is reset to zero so that arbitrarily long sessions can be implemented by repeating the trace file. The process may repeat for the next packet at step 114.

The present embodiment preferably includes logic to implement the described methods in software modules as a set of computer executable software instructions. The Computer Processing Unit ("CPU") or microprocessor implements the logic that controls the operation of the channel card. The microprocessor executes software that can be programmed by those of skill in the art to provide the described functionality. The software can be represent as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods described in further detail below.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that a hardware embodiment may take a variety of different forms. In any of the networks described, it should be understood that a number of other host devices and routers interconnecting other networks may also be part of the network. Although this embodiment uses a round trip delay measurement, unidirectional delay could also be measured. The trace files need not include timestamps, nor must the trace files be actual measured network delay and loss performance characteristic. The trace files may be created by the user to generate any desired network performance. The hardware may be implemented as an integrated circuit with custom gate arrays or an application specific integrated circuit ("ASIC"). Of the course, the embodiment may also be implemented with discrete hardware components and circuitry.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A test system for simulating packet delivery dynamics of a network, comprising:
a plurality of host devices;
a trace profile describing network packet delivery characteristics between the plurality of host devices, wherein the trace profile comprises network delay characteristics and network loss conditions; and
a network simulator in communication with the host devices, the network simulator providing packet delivery between the plurality of host devices, wherein the network simulator utilizes the trace profile to simulate packet delivery dynamics of the network, and wherein the network simulator applies the network delay characteristics and network loss conditions specified in the trace profile to simulate packet delivery dynamics of the network.

2. The invention of claim 1 wherein the network simulator comprises a router.

3. The invention of claim 1 wherein the trace profile comprises actual network packet delivery conditions to dictate the packet delivery dynamics of the test system.

4. The invention of claim 1 wherein the network comprises the Internet.

5. The invention of claim 1 wherein the host devices are identified by Internet Protocol addresses.

6. The invention of claim I wherein the host devices comprise an interactive application program communicating across the test system.

7. The invention of claim 1 wherein the trace profile corresponds to a pair of host devices.

8. The invention of claim 7 wherein the trace profile comprises a timestamp.

9. The invention of claim 7 wherein a plurality of trace profiles are stored in a trace file.

10. The invention of claim 9 wherein the trace file comprises a timestamp, a sequence number and a round-trip delay time for a host device pair.

11. The invention of claim 9 wherein the trace file comprises a header comprising an inter-departure interval time, a packet size, a duration of the trace, and a current date and time.

12. The invention of claim 1 further comprising a delay queue, wherein the network simulator delays the transmission of packets by inserting the packets into the queue.

13. The invention of claim 1 wherein the network simulator comprises a linked list of route data structures comprising a plurality of trace profiles.

14. The invention of claim 13 wherein each of the route data structures corresponds to a host device pair.

15. The invention of claim 13 wherein the trace profiles are maintained in an array associated with the route data structure.

16. The invention of claim 1 wherein the network simulator comprises an IP forwarding software routine, wherein the IP forwarding software routine delays and drops the transmission of packets according to the trace profile.

17. The invention of claim 1 wherein the network simulator comprises a TCP/IP communication protocol to communicate packets over the test system.

18. A test system for simulating packet delivery dynamics of a network, comprising:
a plurality of host devices communicating over the test system using a TCP/IP communication protocol;
a trace profile describing the network packet delivery characteristics between host devices, wherein the trace profile comprises network delay characteristics and network loss conditions;
a network simulator in communication with the host devices, the network simulator providing packet delivery between the plurality of host devices, wherein the network simulator utilizes the trace profile to simulate packet delivery dynamics of the network, and wherein the network simulator applies the network delay characteristics and network loss conditions specified in the trace profile to simulate packet delivery dynamics of the network in the test system; and
a linked list of route data structure comprising a plurality of trace profiles.

19. A test system for simulating packet delivery dynamics of a network, comprising:
a plurality of host devices; and
a network simulator in communication with the host devices, the network simulator providing packet delivery between the plurality of host devices according to actual packet delivery dynamics of the network, wherein the network simulator utilizes a trace profile describing the actual packet delivery dynamics of the network, wherein the trace profile comprises network delay characteristics and network loss conditions.

20. A network measurement system for measuring network packet delivery dynamics of a network, comprising:
a client host device communicating packetized information over the network, the client host device comprising a transmitter for transmitting packets over the network;
a server host device communicating packetized information over the network, the server host device receiving packets from the client host device and sending the received packets back to the host device; and
a trace profile recording the packet delivery dynamics between the client and the server host device, wherein the trace profile is suitable for use in a system for simulating the packet delivery dynamics of a network, and wherein the trace profile comprises network delay characteristics and network loss conditions.

21. The invention of claim 20 wherein the network comprises the Internet.

22. The invention of claim 20 wherein the client host device comprises a timer to schedule the transmission of packets at regular inter-departure times.

23. The invention of claim 20 wherein the packet comprises a sequence number and a client identifier.

24. The invention of claim 20 wherein the server host device comprises a packet counter.

25. The invention of claim 20 where the trace profile comprises a packet sequence number and a round-trip delay for that packet.

26. A method of measuring the packet delivery dynamics of a network, comprising:
transmitting a sequence of packets from a client to a server communicating over the network;
receiving the packet transmitted over the network from the client;
echoing the packet back over the network to the client;
logging the delivery of the packet in a trace file comprising network delay characteristics and network loss conditions for the packet;
simulating the packet delivery dynamics of the network based on the trace file.

27. The method of claim 26 wherein the sequence of packets are transmitted at regular time intervals.

28. The method of claim 26 wherein the step of receiving the packet comprises counting the number of packets received from the client.

29. The method of claim 26 wherein the step of transmitting a sequence of packets comprises transmitting an End of Transmission packet to the server.

30. The method of claim 26 wherein the step of echoing the packet back comprises transmitting a number of packets received.

31. The method of claim 26 wherein the step of logging the delivery of packets comprises recording the sequence number and the round-trip delay time.

32. A method of simulating packet delivery dynamics of a network, comprising:
creating a plurality of trace profiles describing network packet delivery characteristics between a plurality of host devices, wherein each trace profile specifies network delay characteristics and network loss conditions for a pair of host devices;
matching a trace profile corresponding to a pair of host devices at endpoints of the network between which a packet is transmitted; and
delaying transmission of the packet according to the trace profile.

33. The method of claim 32 wherein the step of matching a trace profile comprises matching an IP address for a pair of host devices.

34. The method of claim 32 wherein the step of delaying transmission of the packet comprises calculating a transmit time from a delay time.

35. The method of claim 34 wherein the step of delaying transmission of the packet comprises inserting the packet into a delay queue according to the calculated transmit time.

36. The method of claim 34 wherein the packet is dropped by not transmitting the packet when the delay time comprises zero.

* * * * *